No. 678,081. Patented July 9, 1901.
Z. WIRT.
MULTICYLINDER MOTOR.
(Application filed Jan. 19, 1900.)
(No Model.) 6 Sheets—Sheet 1.

No. 678,081. Patented July 9, 1901.
Z. WIRT.
MULTICYLINDER MOTOR.
(Application filed Jan. 19, 1900.)

(No Model.) 6 Sheets—Sheet 3.

Witnesses:
G. C. Davison
John Enders Jr.

Inventor,
Zebulon Wirt,
By Dyrenforth, Dyrenforth & Lee,
Att'ys

No. 678,081. Patented July 9, 1901.
Z. WIRT.
MULTICYLINDER MOTOR.
(Application filed Jan. 19, 1900.)
(No Model.) 6 Sheets—Sheet 4.
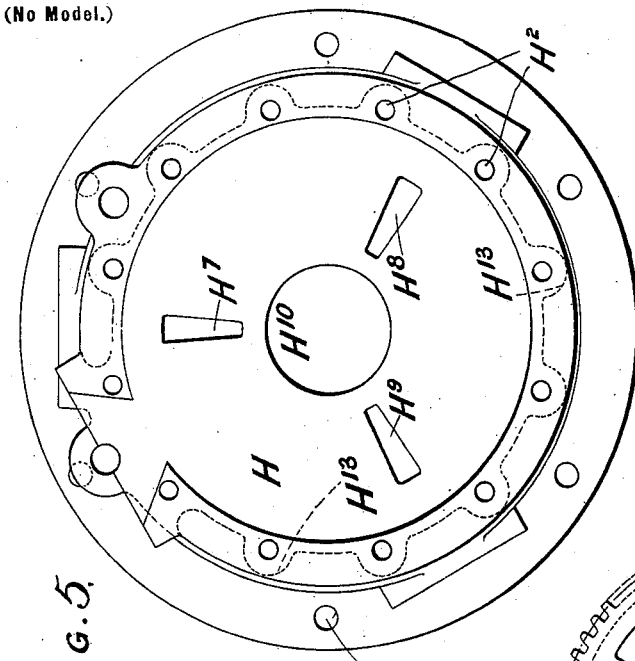
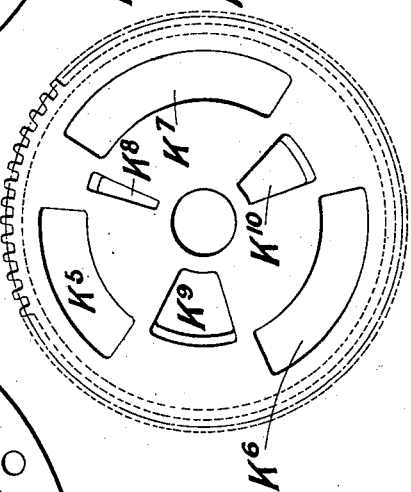
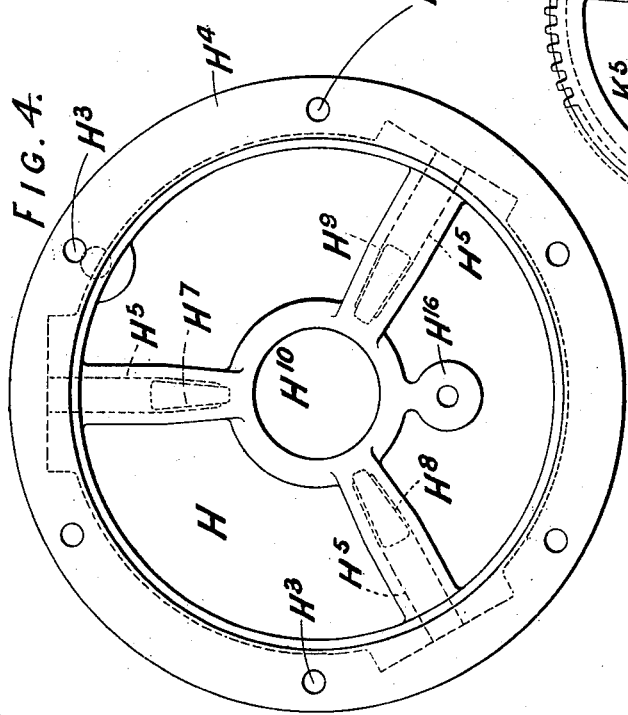
Witnesses:
G. C. Davisu
John Enders Jr.
Inventor:
Zebulon Wirt,
By Dyrenforth, Dyrenforth & Lee,
Att'ys
THE NORRIS PETERS CO., PHOTO-LITHO., WASHINGTON, D. C.

No. 678,081. Patented July 9, 1901.
Z. WIRT.
MULTICYLINDER MOTOR.
(Application filed Jan. 19, 1900.)

(No Model.) 6 Sheets—Sheet 5.

Witnesses:
G. C. Davison
John Enders Jr.

Inventor:
Zebulon Wirt,
By Dyrenforth, Dyrenforth & Lee,
Att'ys.

THE NORRIS PETERS CO., PHOTO-LITHO., WASHINGTON, D. C.

No. 678,081. Patented July 9, 1901.
Z. WIRT.
MULTICYLINDER MOTOR.
(Application filed Jan. 19, 1900.)
(No Model.) 6 Sheets—Sheet 6.
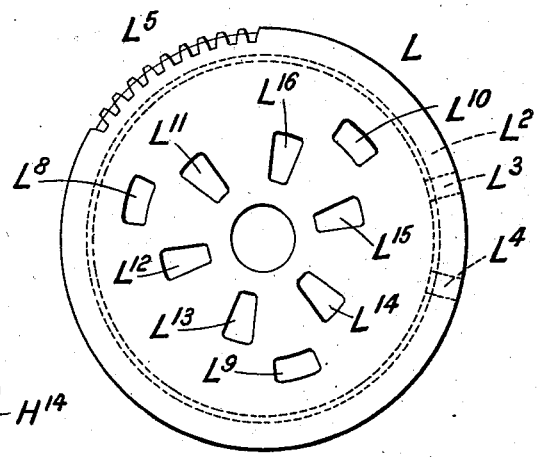
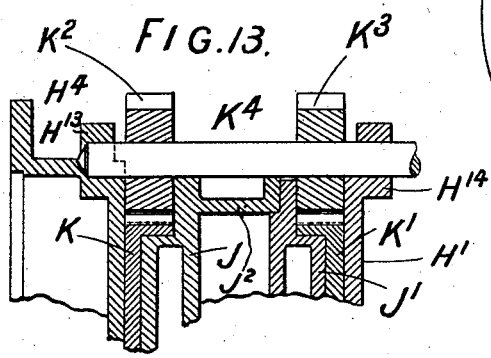
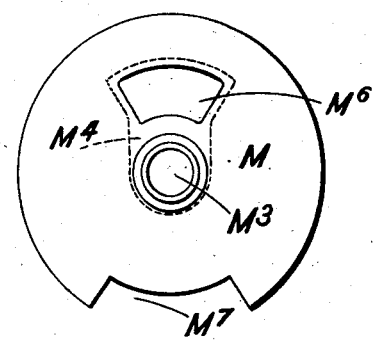
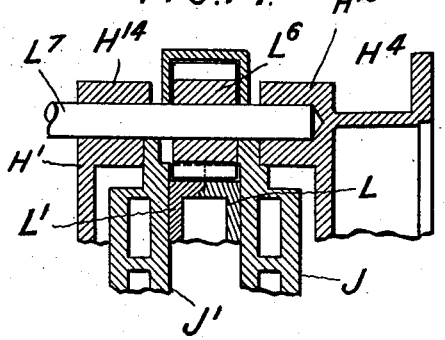
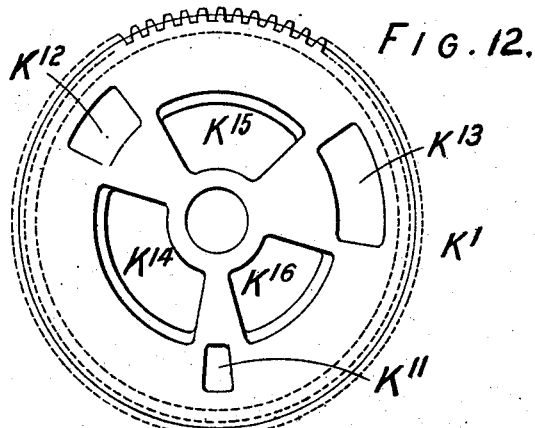
Witnesses:
G. C. Davison
John Enders Jr.
Inventor:
Zebulon Wirt,
By Dyrenforth, Dyrenforth & Lee,
Att'ys.

UNITED STATES PATENT OFFICE.

ZEBULON WIRT, OF MONTICELLO, INDIANA.

MULTICYLINDER-MOTOR.

SPECIFICATION forming part of Letters Patent No. 678,081, dated July 9, 1901.

Application filed January 19, 1900. Serial No. 2,016. (No model.)

*To all whom it may concern:*

Be it known that I, ZEBULON WIRT, a citizen of the United States of America, residing at Monticello, Indiana, have invented certain new and useful Improvements in Multicylinder-Motors, (for which application has been made in Great Britain under No. 16,348, dated August 11, 1899,) of which the following is a specification.

This invention relates to an improved construction of multicylinder-motors, as well as valves specially adapted for multicylinder-motors of the central-crank-shaft and radiating-cylinder type suitable for motor-car and yacht propulsion, the objects being to secure a maximum effect, while reducing the number of working parts and the size and weight of the engine, to enable the motors to be readily reversed, and also to enable one or more of the cylinders to be put out of action while the remainder continue to run.

In motors of the type above referred to the cylinders, preferably three or more in number, are arranged radially around a common central crank-shaft, and by the successive or alternate admission of an explosive gas, steam, or other expansible fluid the crank-shaft, which is provided with suitable gear for the transmission of power or may be coupled direct, is caused to rotate.

Figure 1:
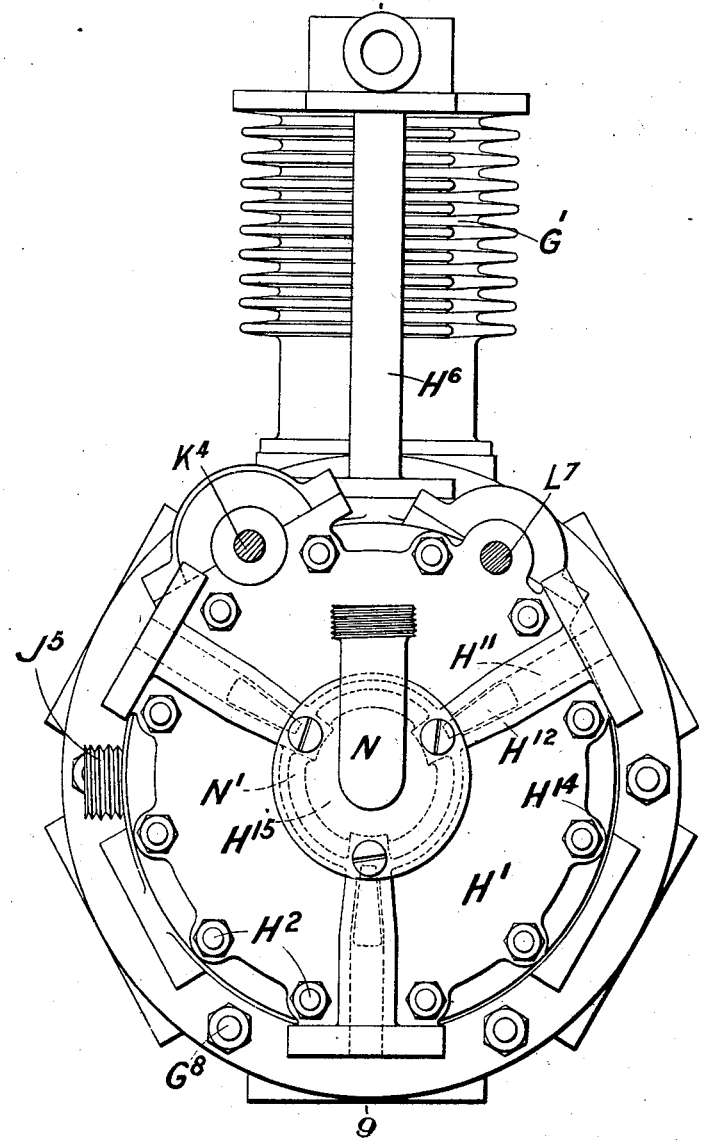
Figure 2:
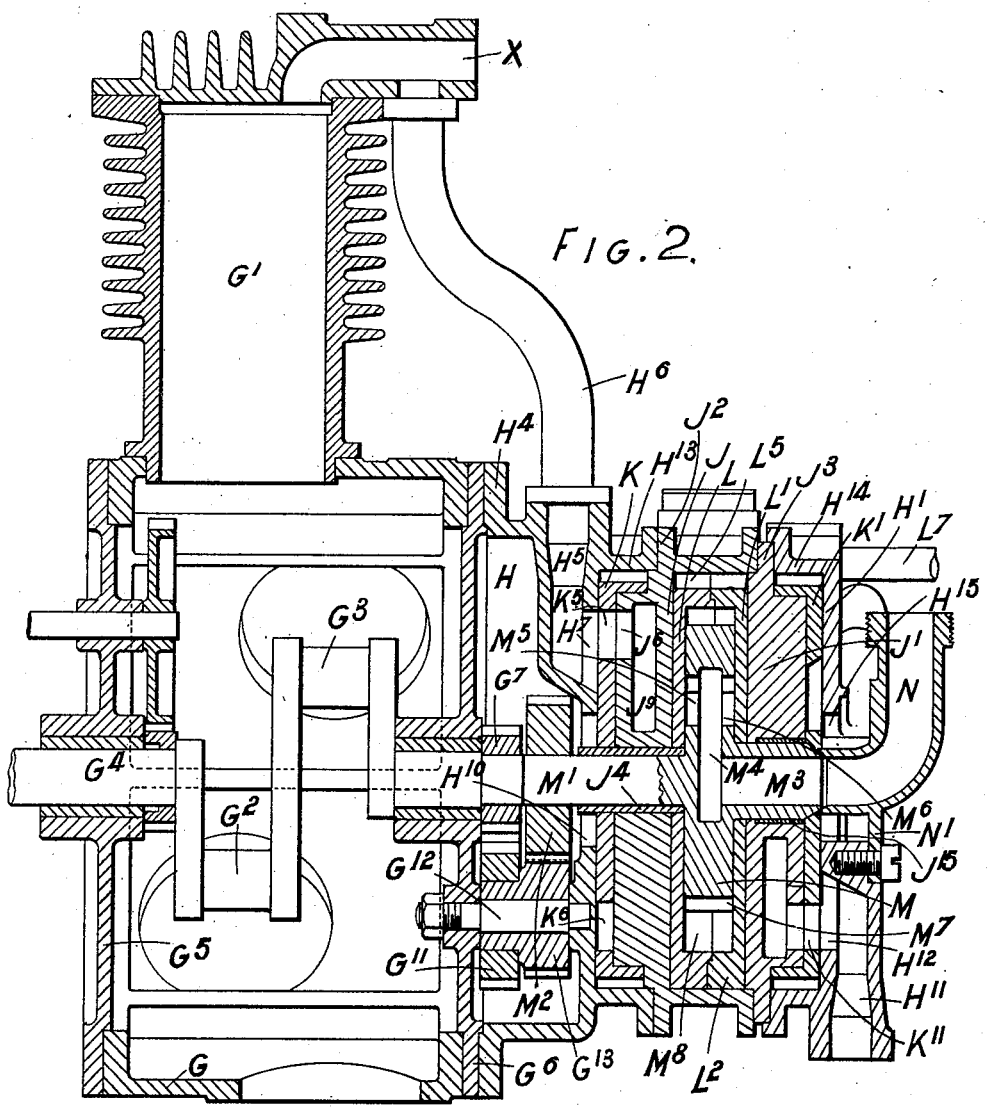
Figure 3:
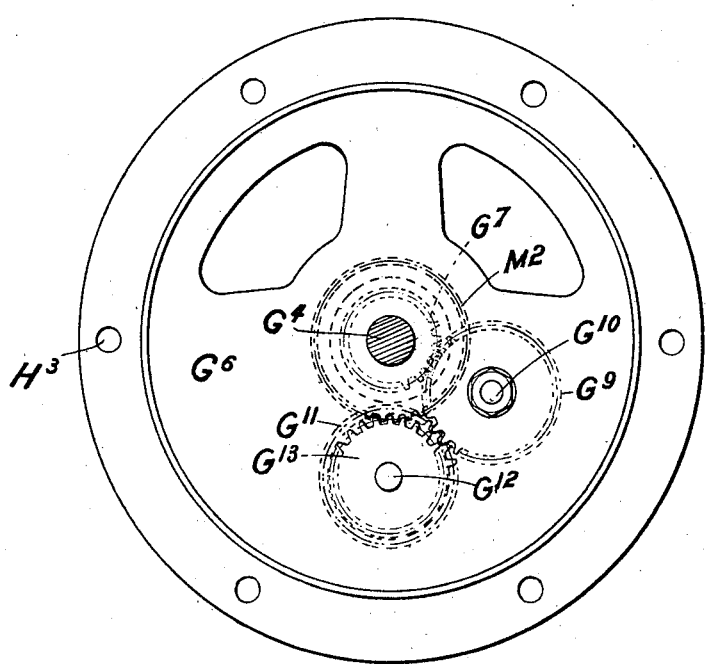
Figure 9:
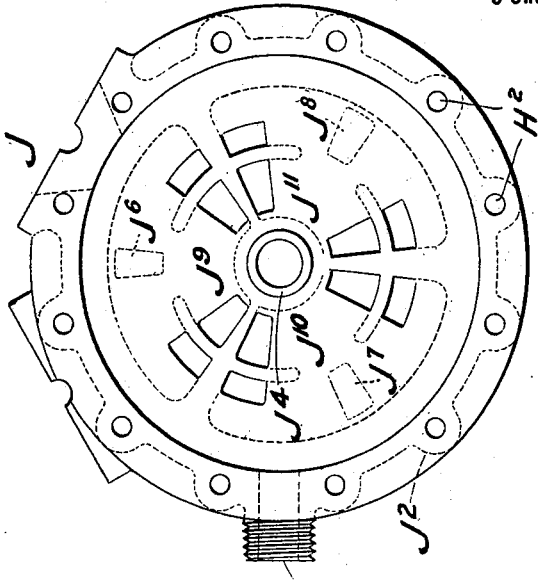
Figure 7:
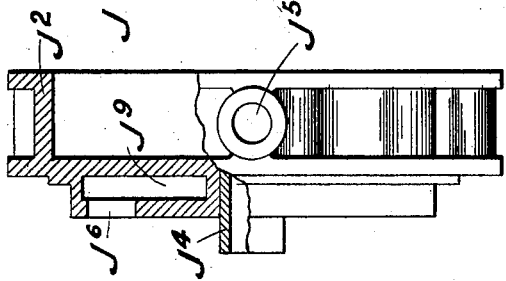
Figure 8:
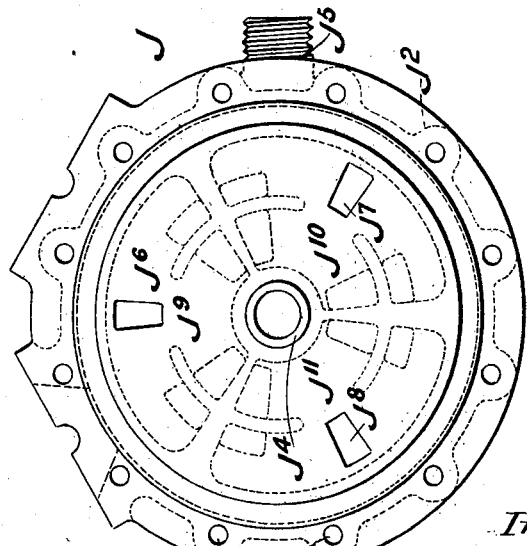

Figure 1 is an end view of a six-cylinder engine with a valve constructed according to this invention, one cylinder only being shown in the figure. Fig. 2 is a section on the line 9 9 of Fig. 1. Fig. 3 is an elevation of one end frame of the motor, showing the gear for operating the valve. Figs. 4 and 5 show the two faces of the inner member of the valve-chest. Fig. 6 is a face view of the inner cut-out disk. Fig. 7 is a side view, half section half elevation, of the inner valve-seat disk. Figs. 8 and 9 are views of the two faces of the same. Fig. 10 is a face view of the inner reversing-disk. Fig. 11 is a face view of the valve, and Fig. 12 is a face view of the outer cut-out disk. Figs. 13 and 14 are details showing the gear for operating the cut-out and reversing disks, respectively.

In the figures I illustrate a form of valve for an engine of the rotary-central-crank-shaft and stationary-radial-cylinder type having six cylinders and two cranks, three cylinders being connected to one crank-pin and three to the other.

G is a cylinder forming the frame of the engine. The cylinders G' (of which only one is shown in Figs. 1 and 2) are six in number and arranged radially around its circumference, three in one vertical plane and three in a parallel overlapping plane, so as to connect, respectively, with the cranks $G^2$ $G^3$ of the central rotary crank-shaft $G^4$. The crank-shaft is carried in bearings in covers or end frames $G^5$ $G^6$ of the cylinder G and is provided at one end with a pinion $G^7$ to operate the valve through intermediate gearing, to be hereinafter described.

The valve comprises four fixed members H H' and J J', consisting of disk-like bodies having circumferential flanges, through which they are secured together by bolts $H^2$, forming the valve-chest, and four adjustable flanged disks K K' and L L' and one rotatable disk M, constituting the valve proper contained within the chest thus formed.

The valve-chest is fixed onto the end frame $G^6$ of the engine by bolts $G^8$, passing through holes $H^3$ in the flange $H^4$ of the inner member H. This inner member is shown in section in Fig. 2, and face views are given in Figs. 4 and 5. It is provided with three passages $H^5$, each passage communicating at one end by a pipe $H^6$ with one of the three cylinders whose pistons are connected with the crank $G^2$ and at the other end opens onto one face of the disk by ports $H^7$ $H^8$ $H^9$, respectively. The member H has also a central opening $H^{10}$. The outer member or cover H' is similar in arrangement to the inner member H, just described, having three passages $H^{11}$, each communicating at one end by a pipe (not shown) with one of the three cylinders whose pistons are connected with the crank $G^3$ and opening at the other by ports $H^{12}$ into the interior of the valve, these ports being placed in positions diametrically opposite to the ports of the member H. The member H and cover H' are provided with flanges $H^{13}$ $H^{14}$, respectively, which are jointed to the flanges $J^2$ $J^3$ of the valve-seat disks J J' by the through-bolts $H^2$, before referred to.

The valve proper is placed centrally within the valve-chest and consists of a disk M, (shown in section, Fig. 2, face view, Fig. 11,)

carried on a central pin or stem, of which one end M' is solid and carries a gear-wheel $M^2$. The other end $M^3$ is hollow, forming a communication with an internal chamber $M^4$, which likewise opens onto each face of the disk through ports $M^5$ $M^6$. The disk pin or stem is rotatably carried in bushings $J^4$ $J^5$, fixed centrally on the disks J J', and its hollow end is preferably beveled and takes a bearing in the similarly-beveled end of the exhaust-pipe N, which passes through an opening $H^{15}$ in the cover H' and is bolted by its flange N' onto the end of the projections in which the passages $H^{11}$ are formed, thus leaving an annular communication through the opening $H^{15}$ between the interior of the valve-chest and the atmosphere for a purpose to be presently described. The disk M is likewise provided with a recess $M^7$.

The valve M is rotated by its gear-wheel $M^2$, operated through intermediate gearing by the pinion $G^7$ on the crank-shaft, so as to run at half the speed and in the reverse direction to the rotation of the crank-shaft. A convenient arrangement is that shown in Fig. 3, in which the pinion $G^7$ gears with a wheel $G^9$, running idly on a pin $G^{10}$, fixed on the end frame $G^6$. The wheel $G^9$ gears with a wheel $G^{11}$, running idly on a pin $G^{12}$, secured to the frame $G^6$ at one end, the other end being supported in a hole in a boss $H^{16}$ on the face of the valve member H. Secured to or formed integral with the wheel $G^{11}$ is a gear-wheel $G^{13}$, which gears with the valve-stem wheel $M^2$.

Placed one on each side of the valve-disk M are the reversing-disks L L', which move together and form the reverser for changing the direction of running of the motor. These disks are rotatably carried on the bushing $J^4$ and valve-stem $M^3$, respectively, and one face of each disk has a working bearing with the adjoining face of the valve M. Each disk is provided with a flange $L^2$. These meet each other at their edges, so as to form a tight joint, thus constituting a closed chamber, within which the valve M revolves, an annular space $M^8$ being left between the periphery of the disk M and the inside surface of the flanges $L^2$. The flanges are provided with two openings or ports $L^3$ $L^4$, Fig. 10, and a segment of their outer surface is toothed, as shown at $L^5$, Figs. 10 and 2. These toothed segments engage a gear-wheel $L^6$, fixed on a rod $L^7$, carried in bearings in the flanges $H^{13}$ $H^{14}$, a suitable opening being provided in the flange $J^2$ to permit of the said engagement. Each disk L L' is provided with three delivery and six exhaust ports, being one delivery and two exhaust ports for each cylinder. The arrangement of these ports in the disk L is shown in Fig. 10, the delivery being lettered $L^8$ $L^9$ $L^{10}$ and the exhaust $L^{11}$ to $L^{16}$, respectively. The arrangement of the ports in the disk L' is similar, relatively to each other, but the delivery-ports are diametrically opposite relatively to the toothed segment—that is to say, one port is in the upper half and two ports in the lower half of the disk.

Placed one on each side of the reversing-disks L L' are what I call the "valve-seat" disks J J', of which the flanges $J^2$ $J^3$ meet so as to form a tight joint, forming, with the disk bodies, a chamber, within which the disks L L' are snugly but adjustably fitted. The flange $J^2$ of the disk J is a broad flange at right angles to the disk body and forms the circumferential wall of the said chamber. In the side of this flange is an opening $J^5$, formed, as shown in Figs. 1 and 7, as a screwed nipple to enable it to be connected with the delivery-pipe from the source of the motive fluid. The body of the disk J is provided with three chambers $J^9$ $J^{10}$ $J^{11}$. (Shown in dotted lines in Figs. 8 and 9, and one chamber in section in Fig. 7.) Each chamber opens onto the face adjoining the disk L by four ports and onto the opposite face by one port, these latter being lettered $J^6$ $J^7$ $J^8$, respectively. The disk J' is furnished with similar chambers and ports arranged like those of disk J relatively to each other, but diametrically opposite relatively to the body of the disk—that is to say, one chamber, such as $J^6$, would be in the lower half of the disk and the other two in the upper half.

As seen in Fig. 2, the flanges $J^2$ and $H^{13}$ and $J^3$ and $H^{14}$ meet, so as to form tight joints, constituting, with their respective bodies, two chambers, within which are placed the adjustable disks K K', respectively, which move together and form a cut-out for cutting out the cylinders in succession, as many as desired. The faces of each disk have a working bearing with the faces of the adjoining valve members, and the periphery of each disk is toothed, the teeth engaging, respectively, with gear-wheels $K^2$ $K^3$, fixed on one rod $K^4$, carried in bearings in the flanges $H^{13}$, $J^2$, and $H^{14}$, Fig. 13. Suitable openings are provided in the flanges $H^{13}$ and $H^{14}$ to permit of said engagements.

The disk K is provided with ports arranged as shown in Fig. 13, $K^5$ $K^6$ $K^7$ being delivery and $K^8$ $K^9$ $K^{10}$ vent ports. The disk K' likewise has six ports, $K^{11}$ $K^{12}$ $K^{13}$ being delivery and $K^{14}$ $K^{15}$ $K^{16}$ vent ports, Fig. 12.

From the above description it will be gathered that the three cylinders connected with one crank are operated through those members of the valve which are on one side of the revolving disk M and the other three cylinders by those on the other side, the disk M being common to and controlling the admission and exhaust of the motive fluid to both sets of members.

The operation of the valve is as follows: Supposing that all the cylinders are desired to run, the cut-out disks K K' are placed with their ports arranged in the position shown in Figs. 2, 6, and 12 relatively to the ports of the adjacent faces of the valve members H and J and H' and J', respectively—that is to say, the three ports $K^{11}$ $K^{12}$ $K^{13}$ of the disk K' and $K^5$ $K^6$ $K^7$ of the disk K are opposite and form a communication between the three ports of each of the faces of said members. As before described, the two disks $K'$ and K are capable of rotation by the wheels $K^2$ $K^3$, fixed on the same rod $K^4$. The first effect of rotating the rod so as to move the disk, Fig. 12, toward the left will be to move the port $K^{11}$, so as to shut off communication between the passage $H^{11}$, Fig. 2, and the corresponding port of the disk $J'$—that is, the connection between the valve and one cylinder of the motor—but open communication through the port $K^{14}$ between the said cylinder and the atmosphere through the central opening $H^5$ of the cover $H'$, so that while the cylinder is cut off from receiving any supply of motive fluid the formation of pressure or vacuum within it is prevented. Continued rotation of the rod in like manner shuts off in succession the remaining two cylinders, which receive the fluid through the cover $H'$, and then in succession those which are connected with the passages in the inner member H, the vent-ports $K^8$ $K^9$ $K^{10}$ giving communication with the atmosphere through the central opening $H^{10}$ of the member H. When the disks K $K'$ are in their normal position, therefore, there is free connection between the three passages $H^5$, leading to the cylinders, and the ports $J^6$ $J^7$ $J^8$ of the valve-face disk J, and also between the corresponding ports of the disk $J'$ and the passages $H^{11}$ in the cover $H'$, leading to the other three cylinders. If, now, it is desired to run so as to revolve the crank-shaft from right to left, (when looking at Fig. 1,) the reversing-disks L $L'$ are placed so that the port $L^4$ in their flanges is in connection with the delivery-pipe $J^5$ and the motive fluid finds admittance to the annular space $M^8$ and recess $M^7$ of the rotating valve M. At the same time the ports of the reversing disk K are so placed relatively to those on the adjoining face of the valve-seat disk J that each of the entry-ports $L^8$ $L^9$ $L^{10}$ and the exhaust-ports $L^{11}$ $L^{13}$ $L^{15}$ are over one of the outer or entry ports and one of the inner or delivery ports of each of the chambers $J^9$ $J^{11}$ $J^{10}$, respectively. The corresponding ports of the disks $L'$ and $J'$ are similarly placed relatively to each other. As the valve M revolves from left to right (it will be remembered that the valve rotates in an opposite direction to the crank-shaft) its recess $M^7$ successively uncovers the ports $L^8$ $L^9$ $L^{10}$ and admits the motive fluid through their respective chambers, ports $J^6$ $J^7$ $J^8$, $K^5$ $K^6$ $K^7$, and $H^7$ $H^8$ $H^9$, passages $H^5$, and pipes $H^6$ to the three cylinders connected with the crank-shaft $G^2$. The exhaust fluid returns by the same ports to the chambers of the valve-seat disk J and then pass by the respective exhaust-ports to the exhaust-port $M^6$ of the valve M, from which it passes through the chamber $M^4$ and hollow stem $M^3$ to the exhaust-pipe N. The cylinders connected to the crank-shaft $G^3$ are supplied and exhausted in a similar manner through the ports and passages of the valve members $L'$, $J'$, $K'$, and $H'$, which, it will be remembered, are arranged similarly relatively to each other. If, now, it be desired to reverse the engine, the rod $L^7$ is used to rotate the disks L and $L'$ by their common gear-wheel $L^6$, so as to place each of the ports $L^8$ $L^9$ $L^{10}$ of the disk L (and similarly the ports of the disk $L'$) over the other outer or entry port of each of the chambers $J^9$ $J^{10}$ $J^{11}$ and place each of the exhaust-ports $L^{12}$ $L^{14}$ $L^{16}$ over an exhaust-port leading to the said chambers. A further rotation of the disks L $L'$ will close all the entry-ports, cutting off the supply of motive fluid to the motor.

The arrangement of cylinders described in connection with Figs. 1 and 2 possesses particular advantages. By providing the multiple cylinders in two circumferential parallel series with the members of the series alternating with each other and with pistons equal in number and weight connected with oppositely-disposed cranks an equilibrium is maintained which reduces vibration to the minimum and enables the provision of a large number of cylinders of large diameter within a comparatively small compass.

What I claim as new, and desire to secure by Letters Patent, is—

1. In a multiple-cylinder motor, the combination with the stationary valve-casing containing an inlet-port and the ports of feed and exhaust passages communicating with all of the cylinders, of a valve between the said inlet and said feed and exhaust ports, said valve being rotatory and governing the feed and exhaust of all of the cylinders, and a combined reversing and throttle disk between the said inlet and said feed and exhaust ports, said disk being rotatable on its axis to control the direction of the motor and to stop the motor by cutting off the supply of motor fluid to the valve.

2. In a multiple-cylinder motor, the combination with the stationary valve-casing containing an inlet-port and the ports of feed and exhaust passages communicating with all of the cylinders, of a valve governing the feed and exhaust of all the cylinders, and a combined reversing and throttle disk rotatable on its axis to control the direction of the motor in two of its positions and in a third position to stop the motor by cutting off the supply of motor fluid to the valve.

3. In a multiple-cylinder motor, the combination with a stationary valve-casing containing an inlet-port and the ports of feed and exhaust passages communicating with all of the cylinders, of a valve movable to govern the feed and exhaust of all of the cylinders, a cut-out disk movable to successively cut the cylinders in and cut them out, and a combined reversing and throttle disk movable to control the direction of the motor and to stop the motor.

4. In a multiple-cylinder motor, the combination with the stationary valve-casing containing an inlet-port and the ports of feed and exhaust passages communicating with all said cylinders, of a valve and a cut-out disk between the said inlet and said feed and exhaust ports, said valve being rotatory and governing the feed and exhaust of all the cylinders and said cut-out disk being rotatable on its axis to adjust it to successively cut the cylinders in and cut them out, substantially as described.

5. In a multiple-cylinder motor, the combination with the stationary valve-casing containing an inlet-port and the ports of feed and exhaust passages communicating with all said cylinders, of a valve, a reversing-disk and a cut-out disk, between the said inlet and said feed and exhaust ports, said valve being rotatory and governing the feed and exhaust of all the cylinders, said reversing-disk being rotatable on its axis to adjust it in two positions to control the direction of running of the motor, and said cut-out disk being rotatable on its axis to adjust it to successively cut the cylinders in and cut them out, substantially as described.

6. In a multicylinder-motor, the combination of a rotating valve-disk, ports in said valve-disk, a valve-seat having ports for each cylinder arranged to receive the motive fluid from two positions on its face and with two exhaust-ports for each cylinder on said face, and a reversing-disk placed between the valve-disk and the valve-seat, supply and exhaust ports for each cylinder in said reversing-disk, and means for partially rotating said reversing-disk to adjust its ports relative to the ports of the valve-seat face to control the direction of running of the motor, substantially as described.

7. In a multicylinder-motor, the combination of a stationary valve-seat disk, a chamber for each cylinder in said disk, a plurality of ports for each chamber on one face of the said disk, a port for each chamber on the other face of the disk, a rotating valve-disk, ports in said rotating valve-disk, a reversing-disk placed between said valve-seat disk and the rotating valve, adjustable relatively to the valve-seat disk and ports in the reversing-disk for connecting the ports of the rotating valve-disk with ports of the valve-seat disk, substantially as and for the purpose specified.

8. In a multicylinder-motor, the combination of a stationary valve-seat disk, a chamber for each cylinder in said disk, a plurality of ports for each chamber on one face of the said disk, a port for each chamber on the other face of the disk, a rotating valve-disk, ports in said rotating valve-disk, a reversing-disk, placed between said valve-seat disk and the rotating valve, adjustable relatively to the valve-seat disk, and ports in the reversing-disk for connecting the ports of the rotating valve-disk with ports of the valve-seat disk, a valve-case wall, ports in said wall, conduits leading from said ports to the cylinders, a cut-out disk arranged between the said wall and the valve-seat disk, ports in said cut-out disk and means for adjusting the said cut-out disk, substantially as and for the purpose specified.

In testimony whereof I have signed my name to this specification in the presence of two subscribing witnesses.

ZEBULON WIRT.

Witnesses:
J. W. DYRENFORTH,
F. J. MARTIN.